United States Patent [19]

Gorgens et al.

[11] Patent Number: 4,502,334
[45] Date of Patent: Mar. 5, 1985

[54] COMBINED PRESSURE GAUGE-TRANSMITTER

[75] Inventors: Joseph E. Gorgens, Trumbull; Randall Goff, Weston; Stephen G. Sardi, Milford, all of Conn.

[73] Assignee: Dresser Industries, Inc., Dallas, Tex.

[21] Appl. No.: 520,353

[22] Filed: Aug. 4, 1983

[51] Int. Cl.³ .......................... G01D 5/34; G01L 7/04
[52] U.S. Cl. ........................................ 73/705; 73/733; 250/231 P
[58] Field of Search ............... 73/733, 734, 735, 740, 73/705; 250/231 P

[56] References Cited

U.S. PATENT DOCUMENTS

| | | | |
|---|---|---|---|
| 2,656,721 | 10/1953 | Melchior | 73/389 |
| 3,691,843 | 9/1972 | Gorgens et al. | 73/411 |
| 3,742,233 | 6/1973 | Gorgens et al. | 250/231 R |
| 4,109,147 | 8/1978 | Heske | 250/231 P |
| 4,184,377 | 1/1980 | Hubbard | 73/733 |

FOREIGN PATENT DOCUMENTS 130960  5/1978  German Democratic Rep. ... 73/740

OTHER PUBLICATIONS

New England Instrument Company "Ratio/Metric Low-Cost Precision P-200-G Series Pressure Sensor".
Wika "Two-Line Transmitter-Piezoresistive".
"Analog Sensing of Displacement Using Silicon Solar Cell", *IEEE Transactions on Industrial Electronics and Control Instrumentation*, vol. IECI-26, No. 2, May 1979.

*Primary Examiner*—Donald O. Woodiel
*Attorney, Agent, or Firm*—Daniel Rubin

[57] ABSTRACT

A Bourdon tube adapted for connection to a source of fluid pressure operates both a mechanically driven gauge pointer and an optical-electronic transmitter for providing operatively parallel output signals corresponding to values of pressure incurred by the fluid source. Simultaneously operative from the displaceable end of the Bourdon tube are both a mechanical movement for effecting amplified displacement of the pointer relative to a dial plate and an opaque vane displaceable within the transmitter between a photoemitter and a pair of photosensors. Circuitry in the transmitter responsive to discrete changes in light interruption between the vane and one of the photosensors emits a signal current corresponding to the pressure value at any given position of the vane.

8 Claims, 9 Drawing Figures

U.S. Patent   Mar. 5, 1985   Sheet 1 of 3   4,502,334
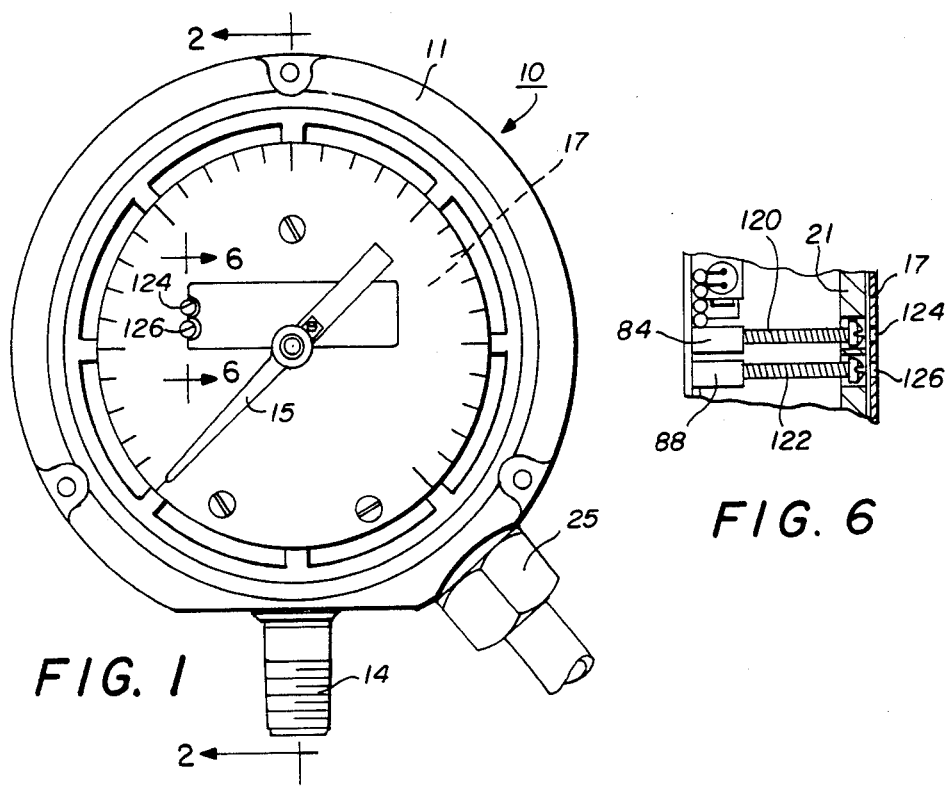
FIG. 1
FIG. 6
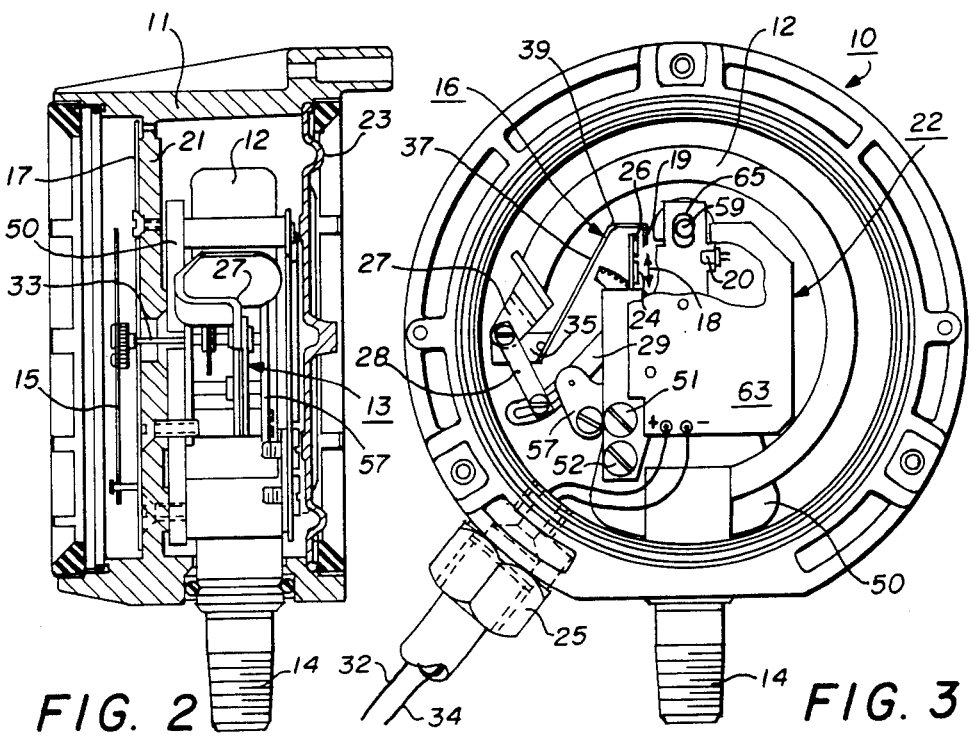
FIG. 2
FIG. 3

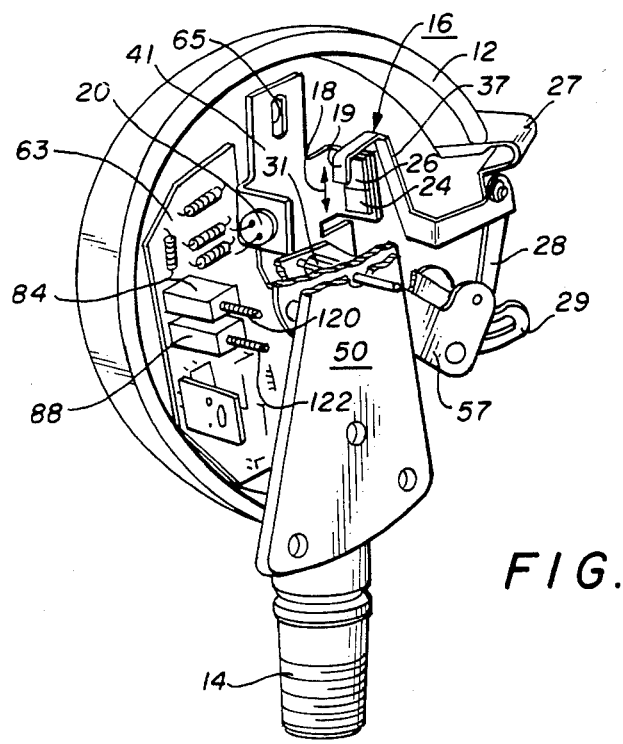
FIG. 4
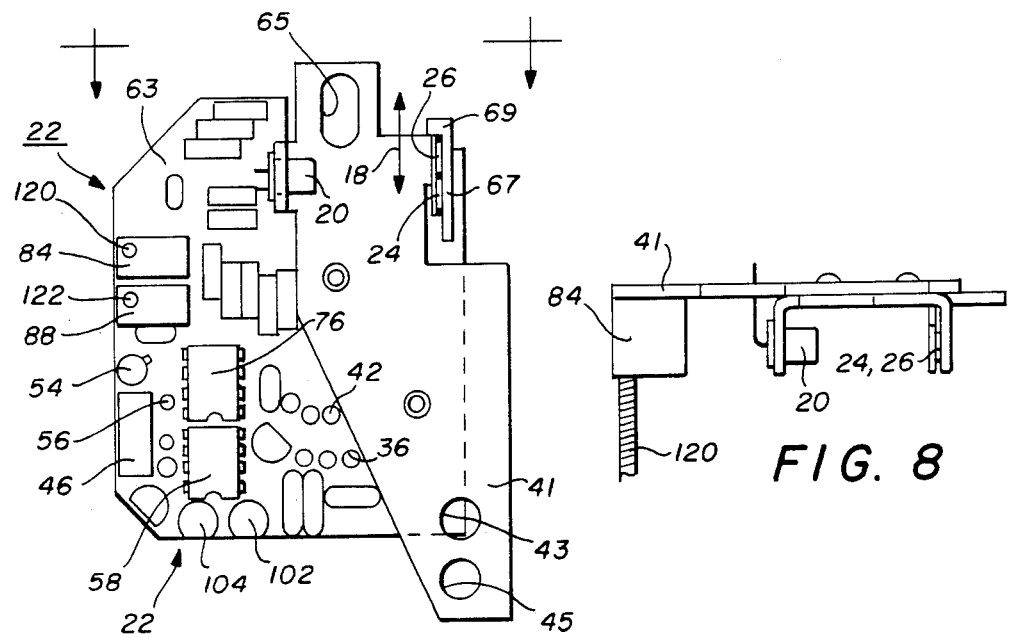
FIG. 7
FIG. 8

COMBINED PRESSURE GAUGE-TRANSMITTER

TECHNICAL FIELD

The technical field to which the invention relates comprises the field of measuring and testing.

BACKGROUND OF THE INVENTION

By and large, most condition responsive gauge instruments typically employ a condition responsive element such as a bellows, Bourdon tube, bimetal coil or the like which incurs displacement in response to condition changes to which the element is sensitive. In the usual gauge of quality construction, there is employed an amplifier or "movement" comprised of leverage and gearing operably responsive to displacement motion of the condition responsive element for driving an output shaft supporting a pointer movable relative to a fixed dial plate. The dial registration opposite the pointer position is indicative of the condition state such as pressure or temperature with which the instrument is being operated.

With recent trends toward electronic transmitters for remote readout, it has become known to utilize the condition responsive element for providing the pressure sensitive input thereto. Exemplifying electronic generation of condition values in a photo-optic arrangement are the disclosures of U.S. Pat. Nos. 3,742,233 and 4,109,147. While it is recognized that utilizing a Bourdon tube as the condition responsive element to either drive a mechanical pointer or displace a vane in a photo-optic transmitter is individually known, it has not been known heretofore how to effectively combine the two in a single compact unit without one interfering with operation of the other and in a manner which lends to ready conversion of an existing pressure gauge to a combination gauge-transmitter.

SUMMARY OF THE INVENTION

This invention relates to a combination pressure gauge-transmitter in which a Bourdon tube connected to a source of fluid pressure provides the displacement input to simultaneously operate both a mechanically driven gauge pointer and an optical-electronic transmitter. More specifically, the invention relates to such a combination in a unique geometric arrangement affording sufficient compactness as to enable substantial utilization of standard pressure gauge components in effecting the gauge-transmitter combination.

The foregoing is achieved in accordance with the invention by utilizing a standard C-shaped Bourdon tube, the free end of which is bi-connected to a mechanical movement for driving the gauge pointer and to an opaque vane for operating the transmitter. In a preferred embodiment, the photo-optic transmitter is physically positioned within the arcuate inner circumference of the Bourdon tube and includes a spaced light path between a photoemitter and a pair of light sensors, one of which is adapted to be gradually interrupted and uninterrupted by the vane being displaced by the Bourdon tube. The vane is configured and arranged to move in a path parallel with the surface of the photosensors and to the tube tip of the Bourdon tip, while electronic circuitry responsive to the interrupting position of the light path emits a level of signal current corresponding to the pressure value at any given position of the vane. By means of this arrangement, it is possible to achieve high accuracy of pressure measurement at minimum construction cost while affording a flexibility of construction not previously available.

It is therefore an object of the invention to provide a novel combination pressure gauge electronic transmitter construction.

It is a further object of the invention to effect the previous object in an economical and efficient manner unlike similar purpose constructions of the prior art.

BRIEF DESCRIPTION OF THE DRAWINGS

FIG. 1 is a front elevation view of the pressure gauge-transmitter in accordance with the invention;

FIG. 2 is a sectional elevation taken substantially along the lines 2—2 of FIG. 1;

FIG. 3 is a rear view with the cover removed of the pressure gauge-transmitter;

FIG. 4 is an isometric view of the transmitter components;

FIG. 6 is a sectional view taken substantially along the lines 6—6 of FIG. 1;

FIG. 7 is a front view of the transmitter assembly;

FIG. 8 is top view of FIG. 7; and

Figure 5:
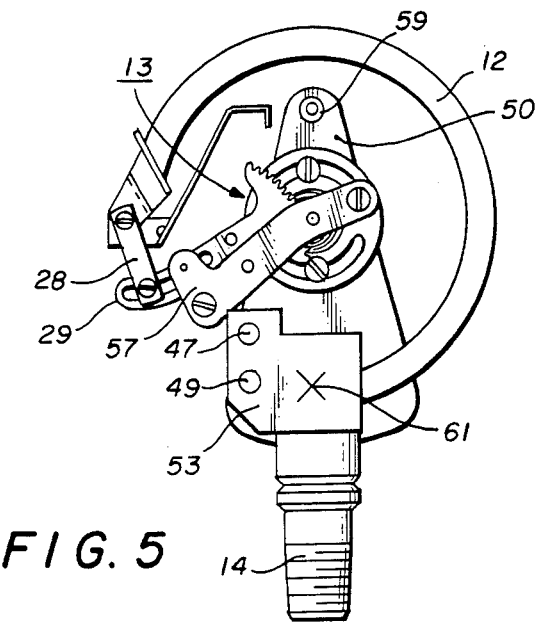
FIG. 5 is a partially disassembled elevation of the pressure gauge elements.

Referring initially to FIGS. 1-3, the pressure gauge-transmitter hereof designated 10 is comprised of a case 11 of the solid front type, including a solid front wall 27 and flexible opaque back 23. Contained within the case is a Bourdon tube 12 adapted via a movement 13 in response to pressure changes received at inlet 14 to operate a pointer 15 displaceable opposite a dial plate 17. Also attached to the free end of Bourdon tube 12 and simultaneously displaceable therewith is a vane 16 as will be further described below. The vane terminates at its distal end in a planar opaque shield 19 displaceable in the direction of arrows 18 within transmitter assembly 22 between a light emitting diode 20 and a pair of light sensors 24 and 26. Electrical leads 32 and 34 for energizing and transmitting signals from transmitter assembly 22 are provided through socket unit 25 to effect operation of circuit 30 (FIG. 9) as will be described below.

At its free end, Bourdon tube 12 is fitted with a tip bracket 27 to which is pivotally secured a link 28 pivotally secured in turn to the tail end of a segment gear 29 pivotally mounted on a bracket 57. Displacement of segment gear 29 operates in a well known manner via pinion 31 secured on pointer shaft 33 to operatively displace pointer 15. Commonly secured with link 28 to the free end of Bourdon tube 12 for a fixed non-pivotal displacement is an elongated vane 16 that includes a tail portion 35 extending laterally to an angularly offset portion 37 and merging with a horizontal offset 39 before connecting with the turned over above mentioned opaque vertical shield 19.

For supporting transmitter unit 22 within the circumference of tube 12 in a manner substantially free of any pipe strain imposed on socket 14, there is provided a mounting bracket 53 (FIG. 5). Bracket 53 is secured by a weld at 61 to socket 14 and includes threaded apertures 47 and 49 adapted to receive mounting plate 41 having matching apertures 43 and 45 and supporting printed circuit board 63. A post 59, staked in support plate 50, provides oriented mounting of plate 41 thereon via elongated aperture 65. By means of screws 51 and 52 and post 59, plate 41 can be accurately located and secured in position. Critical to the accuracy of the device in this arrangement is displacement of shield 19 operative in a plane that extends parallel to the surface of photosensors 24 and 26 and to the travel of the Bourdon tube tip. This practically, although not exactly, coincides to movement in a plane extending perpendicular to the polar point of the tube arc of Bourdon tube 12. To protect the photosensors 24 and 26 from the possibility of impact occasioned by shock or impact imposed on vane 16, there is provided a parallel plate 67 (FIG. 7) having a lateral tab 69 extending past the sensor plane toward the path of vane travel 18.

Figure 9:
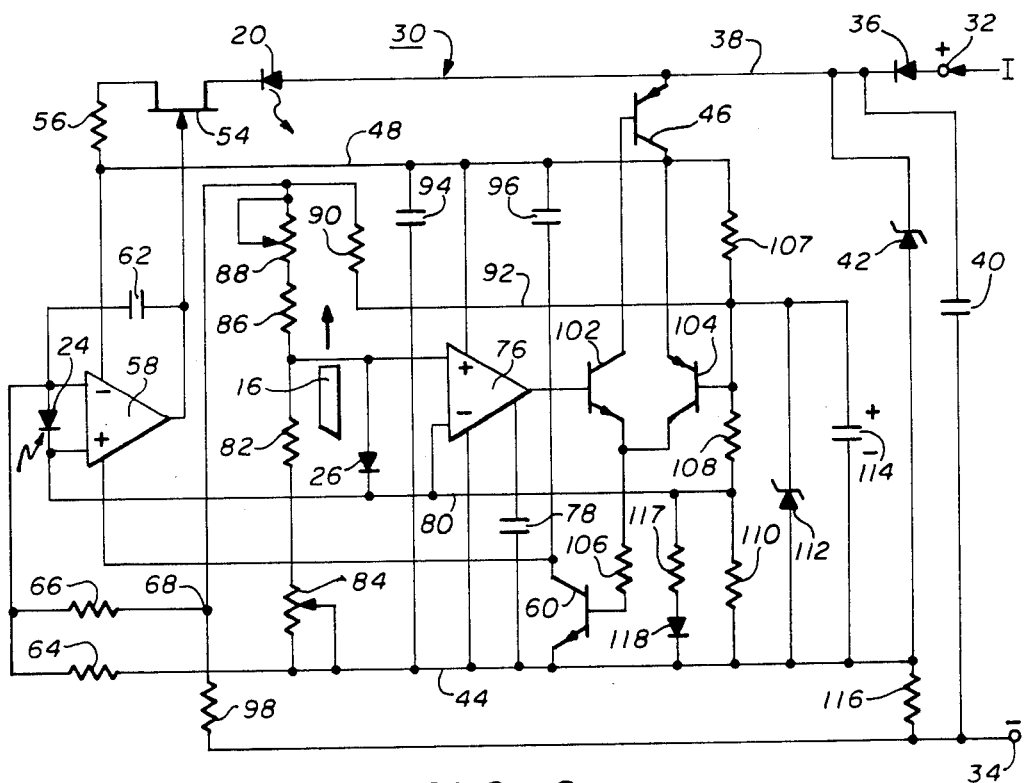
FIG. 9 is a schematic circuit diagram for the transmitter.

The circuit 30 illustrated in FIG. 9 is more completely disclosed in commonly owned copending application "Photo Transducer Circuit" by B. Bulat, Ser. No. 455,679, filed Jan. 5, 1983 and incorporated herein by reference. Briefly, as therein described, sensors 24 and 26 are photo diodes which are operable in a short circuit condition across the terminals of operational amplifiers 58 and 76. When light emitted from emitter 20 falls on one of the sensors 24, 26, the voltage is increased at the anode terminal thereof, and current levels through the power terminals 32 and 34 vary between 4 and 20 milliamps in proportion to the extent of light exposure received by sensor 26.

The impedances of resistors 90 and 98 are selected to have values that apply a voltage state to the input terminals of amplifier 76 producing a controlled current flow through transistors 46, 104 and 60 when shield 19 of vane 16 fully covers sensor 26. The total current through resistors 64 and 101, potentiometer 84, transistor 60, diode 118 and zener diode 112 for a proper zero setting under those circumstances is 4 milliamps and flows through resistor 116 to essentially comprise the total current flow between terminals 32 and 34.

The primary current path between the power terminals is serially through resistor 46, transistor 104, resistor 106 and transistor 60, the level of which is controlled by the output of operational amplifier 76. When the output of the amplifier 76 increases in voltage, transistor 102 is turned on to a greater extent tending to further turn on transistor 46, and as the latter becomes more conductive it sources a greater current from terminal 32 for feed to node 48.

When vane 16 is at the opposite extreme position permitting a substantially uninterrupted total exposure of sensor 26 to the light output of emitter 20, the additional current from sensor 26 passes through resistor 86 and potentiometer 88 adjusted to permit full span 20 milliamp current through resistor 116. Since the output of sensor 26 is proportional to the extent of light interruption effected at any given position of vane 16, an increased output signal is produced via amplifier 76, transistor 102 and transistor 46 to terminal 34. By these means, the circuit produces an output signal wherein the signal current varies between a minimum and maximum amplitude in proportion to the position of vane shield 19 interrupting the transmission of light between emitter 20 and sensor 26. For maximum temperature stability, the support structure is of metal selected for having a thermal coefficient of expansion closely matched to the mechanical structure of the gauge.

To insure insensitivity to ambient light, light traps are provided about the calibration adjustments for zero and span setting in the form of screws captive in flexible shafts 120 and 122 initiated adjacent dial plate openings 124 and 126 (FIGS. 1 and 6). With the shafts extending laterally from behind the dial plate to the settable adjustments of potentiometers 84 and 88, the potentiometers can be readily set for proper calibration under conditions of ambient light.

By the above description there is disclosed a pressure gauge-optical transmitter in combination which because of its unique and compact arrangement not only lends itself to a construction utilizing existing gauge components but also by virtue of its arrangement lends to readily modifying an existing pressure gauge for effecting the combination gauge-transmitter hereof. Not only, therefore, is the described combination economical to manufacture, but because of the specific arrangement, a high order of accuracy is maintained in both the mechanical output of pointer 15 and the electronic output of transmitter 22. Within constraints, optimum linearity is obtained with fairly specific geometry of the photosensors 24, 26, vane 16 and LED 120. The vane should be close to the photosensor surface and the LED but at sufficient distance to minimize cosine errors due to angular deflection of the rays connecting the light source with the edge of the vane.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A combination pressure gauge-transmitter for providing indications of pressure values comprising:
   (a) a gauge case;
   (b) a Bourdon tube within said case of selected configuration having a fixed end connected to an inlet socket adapted for connection to a source of fluid pressure and a free end adapted for displacement in response to changes in values of pressure incurred by the connected fluid source;
   (c) a pointer operatively connected to the free end of said Bourdon tube for displacement therewith relative to a dial plate in correlation to pressure changes incurred by the connected fluid source;
   (d) a vane operatively attached to the free end of said Bourdon tube for displacement therewith in a predetermined travel path in correlation to pressure changes incurred by the connected fluid source; and
   (e) a photo-optic transmitter geometrically positioned within the operative tube arc of said Bourdon tube and including a pair of photosensors, a photo emitter arranged to define a light path projecting toward said photosensors in a direction transverse to the travel path of said vane for said light path to incur gradual increased and decreased interruption by the position of said vane in the course of its displacement and electric circuit means operative continuously to generate an analog signal at any given position of said vane in said light path corresponding to a value of pressure being incurred by the connected fluid source.

2. A combination pressure gauge-transmitter according to claim 1 in which the radiation sensitive surfaces of said photosensors are arranged juxtaposed in a coplanar relation and said travel path of said vane extends generally parallel to the surface of said photosensors and to the tip travel of the free end of said Bourdon tube.

3. A combination pressure gauge-transmitter according to claim 2 in which said transmitter includes a circuit board and a bracket secured to said inlet socket and supporting said circuit board substantially free of pipe strain incurred by said socket.

4. A combination pressure gauge-transmitter according to claim 2 including protection means to prevent vibration contact between said vane and the photosensor surfaces thereat.

5. A combination pressure gauge-transmitter according to claim 4 in which said prevention means comprises a tab extending transversely superposed past said sensors toward said vane travel path.

6. A combination pressure gauge-transmitter according to claim 2 including calibration means enabling adjustment of the zero and span operational settings of said transmitter.

7. A combination pressure gauge-transmitter according to claim 6 including light trap means providing light shielded access to said calibration means from a location on said case exposed to ambient light.

8. A combination pressure gauge-transmitter according to claim 7 in which said light traps comprise flexible screw shafts extending between an access location on said gauge case exposed to ambient light to a lightless location within said gauge case connected to the adjustment settings for said calibration means.

* * * * *